United States Patent [19]

Garrigues et al.

[11] Patent Number: 4,901,979
[45] Date of Patent: Feb. 20, 1990

[54] BUTTERFLY VALVE OF INSPECTABLE TYPE

[75] Inventors: Gean-Claude Garrigues, Cadaujac; Rene Laulhe, Villenave d'Ornon, both of France

[73] Assignee: Applications Mecaniques et Robinetterie Industrielle (A. M. R. I.), Bagnolet Cedex, France

[21] Appl. No.: 361,138

[22] Filed: Jun. 5, 1989

Related U.S. Application Data

[63] Continuation-in-part of Ser. No. 128,613, Dec. 4, 1987, abandoned.

[30] Foreign Application Priority Data

Dec. 5, 1986 [FR] France .............................. 86 17031

[51] Int. Cl.⁴ .............................................. F16K 1/22
[52] U.S. Cl. .................................... 251/306; 251/367; 137/454.2
[58] Field of Search ............... 251/305, 306, 316, 367; 137/315, 454.2, 454.6

[56] References Cited

U.S. PATENT DOCUMENTS

| | | | |
|---|---|---|---|
| 2,750,955 | 6/1950 | Bredtscheider | 137/454.2 |
| 3,250,291 | 5/1966 | Ray | 137/454.6 |
| 3,260,502 | 7/1966 | Plumer | 251/306 |
| 4,194,749 | 3/1980 | Bonofous | 251/306 X |
| 4,593,916 | 6/1986 | Faulke et al. | 251/306 X |

FOREIGN PATENT DOCUMENTS 2538067  6/1984  France .............................. 251/305

Primary Examiner—John Fox
Attorney, Agent, or Firm—M. H. Gay

[57] ABSTRACT

The valve of the present invention comprises a tubular body (1) the central portion (6) of which defines a shut-off chamber (7) which is accessible via an inspection trap (15). Within this chamber (7) there is housed a removable annular pre-body (8) provided with two radial boreholes (9, 10) serving for the rotary mounting of the shaft (11) of the butterfly (12). Sealing means which cooperate with the body (1), the pre-body (8) and the butterfly (12) make it possible to assure the upstream/downstream tightness of the valve. The inspection trap (15) is closed by a cap (28) provided with a passage within which there is rotatably mounted a drive shaft (35) which is coupled to the shaft (11). This structure permits greater ease of access to the inner parts of the valve, a decrease in volume and weight, and greater ease in manufacture.

9 Claims, 2 Drawing Sheets

BUTTERFLY VALVE OF INSPECTABLE TYPE

This application is a continuation-in-part of our application Ser. No. 07/128,613 filed 4 Dec. 1987 for Butterfly Valve of Inspectable Type, now abandoned.

The benefit of French Application Serial No. 86.17031 Filed Dec. 5, 1986 is claimed.

The present invention concerns a butterfly valve of inspectable type, that is to say a valve whose inner parts are accessible from the outside.

In general, it is known that a butterfly valve of conventional type is formed of a tubular body provided with an axial bore and with at least one radial passage within which there is rotatably mounted, with seal, the drive shaft of a butterfly which is movable in rotation with the body. This butterfly then has sealing means adapted to work in conjunction with sealing means borne by the body so as to assure the upstream/downstream tightness of the valve in its closed position.

It has been found that in certain types of installation the user is required to use a non-removable connection of the valve to its piping; this connection being generally produced by welding.

Maintenance of the valve then requires that an inspection trap, which permits access to the inner parts of the valve and allow their removal, be provided in the body of the valve.

At the present time, two types of construction are used to produce this trap.

The first type of construction consists of an inspection trap in a part of the body which is axially staggered with respect to the radial borehole serving for the rotary mounting of the butterfly.

This solution, which makes it possible to obtain independence between the inspection trap and the rotating internals of the butterfly, nevertheless has a number of drawbacks, as follows:

the accessibility to the internals of the valve is difficult since the parts on which the work is customarily carried out on, are not in the axis of the trap;

the work to be done on the valve internals is carried out blind for the same reason;

the body of the valve is necessarily long and therefore heavy and expensive; furthermore, its complex shape results in problems in manufacture.

In the second type of construction, the inspection trap is located at the passage zone of the shaft which is used to drive the butterfly in rotation. It is sealed by a cap which closes the neck of the valve as well as the pivot serving for the rotary mounting of the said shaft.

This solution makes it possible to eliminate most of the drawbacks mentioned above, in the sense that:

it facilitates access to the internal members of the valve, the parts to be dismounted being in the axis of the opening;

the body of the valve produced in this manner is shorter and lighter;

the neck being separated from the body, the production of the valve assembly is made easier.

On the other hand, other drawbacks appear:

the proper operation of the valve is subject to proper alignment of the cap on the body;

this proper operation cannot be checked when the cap is removed.

The invention therefore has, more particularly, object of creating an inspectable butterfly valve which combines the advantages of the two types of construction mentioned above, without having their disadvantages.

For this purpose, it proposes a valve comprising, more particularly, the following:

a tubular body the central part of which defines a shutoff chamber communicating with the outside via a lateral orifice which forms an inspection trap;

an annular inner body or pre-body hereinafter referred to as pre-body which is provided with two diametrically opposite substantially radial boreholes and can pass through said orifice to engage in said chamber with the axis of the said boreholes passing through said orifice;

means which permit a removable attachment of the said pre-body in said body;

a butterfly which is mounted for rotation in said pre-body by means of a shaft which passes into said boreholes;

a sealing mean mounted on the body and/or the pre-body in such a manner as to be able to cooperate with the said butterfly to assure upstream/downstream tightness of the valve;

a cap adapted to be mounted on said body in such a manner as to tightly and removably close said orifice, said cap having a passage in which the shaft for the driving in rotation of the butterfly is rotatably mounted.

It is clear that this type of construction has the advantages (small size and weight—good accessibility) of the second solution mentioned above and further simplifies the shapes and machining operations of the body.

Furthermore, the butterfly and its sealing mean can be put in place and their proper operation can be checked both outside and inside of the body without the cap being placed on.

In accordance with the type of construction, the shaft which serves for the rotary mounting of the butterfly in the pre-body (shaft of the butterfly) and the shaft which passes through the cap and serves for the driving in rotation of the butterfly can be made in one and the same piece.

However, a further benefit of the invention is obtained if these two shafts are separate and are detachably coupled to each other by a mechanical connection adapted to transmit the operating torque and filter out the parasitic forces due to misalignments or deformations in use.

In this case, the shaft of the butterfly is positioned by the pre-body while the operating shaft is positioned by the cap. The quality of the upstream/downstream tightness of the valve then becomes independent of the position of the cap and the tightness at the passage of the drive shaft is not affected by the forces exerted at the level of the butterfly.

It therefore becomes possible to select for the shaft of the butterfly and for the drive shaft different materials, which are specifically adapted to thee stresses which they must withstand.

Furthermore, the addition of the pre-body improves the behavior of the valve upon thermal shocks since the butterfly and said pre-body are both completely bathed by the fluid and therefore have rates of temperature increase or decrease which are closer together than in the previous designs; the thermal stresses and deformations which can affect the performance of the valve are thereby reduced.

The pre-body and the body of the valve can advantageously be made of different materials and by different methods of production which optimize their characteristics. In particular, it is possible to use pre-bodies having very simple shapes which permit the manufacturing of them by machining or by forging.

Another advantage of the invention consists in the fact that the body of the valve serves practically an enclosure function and does not have bearing housings due to the fact that the bearings, and in particular the lower bearing, are provided in the pre-body. It furthermore does not have a retention zone for impurities and condensate which might interfere with the proper operation of the valve, particularly in the case of cryogenic valves.

It should be noted in this connection that frequently, for reasons of production, the housing for the lower bearing is open to the exterior and this opening has to be made fluid tight. The invention, which no longer makes use of this housing, therefore eliminates an additional risk of leakage towards the outside.

By reason of the fact that the sub-assembly formed of the pre-body, the butterfly and its shaft intrinsically accounts for the qualities and performances of the valve and that its assembly is extremely simple, it is therefore possible to contemplate welding the body on the pipeline and then proceeding with the cleaning and conditioning of the circuits or pipeline before proceeding with the mounting of the valve, as a result of which one can expect the best service, while previously the performance of a completely assembled and adjusted welded valve regularly exhibited defects due to the impurities carried along upon the cleanings.

Embodiments of the invention will be described below, by way of illustration and not of limitation, with reference to the accompanying drawings, in which.

Figure 3:
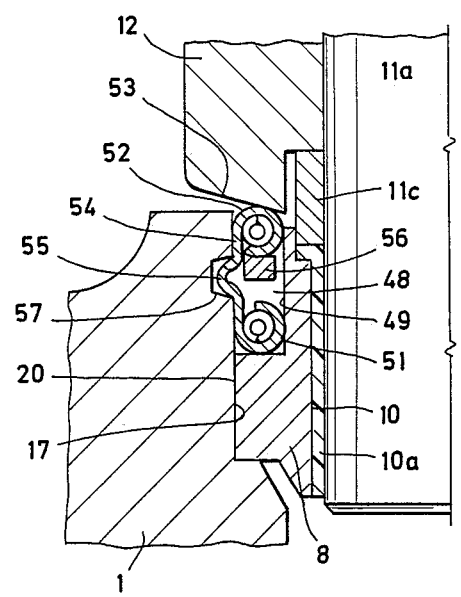
FIG. 3 is a partial axial section on an enlarged scale of the lower portion of the pre-body and the adjacent section of the body.
Figure 4:
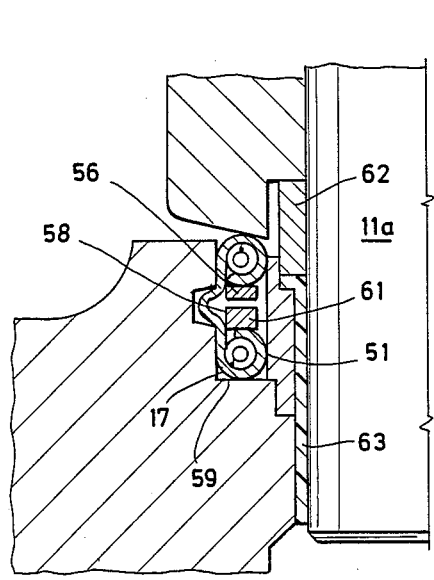
Figure 5:
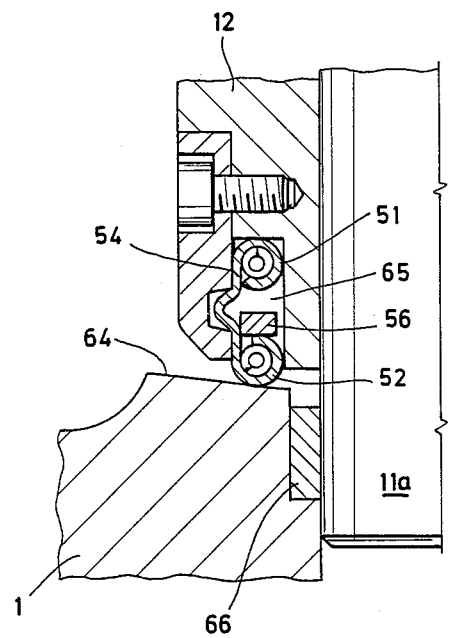

FIG. 4. is a view similar the FIG. 3 showing a modified form of seal;

FIG. 5 is a partial axial section similar to FIG. 3 showing a seal mounted in the butterfly of the valve.

Figure 1:
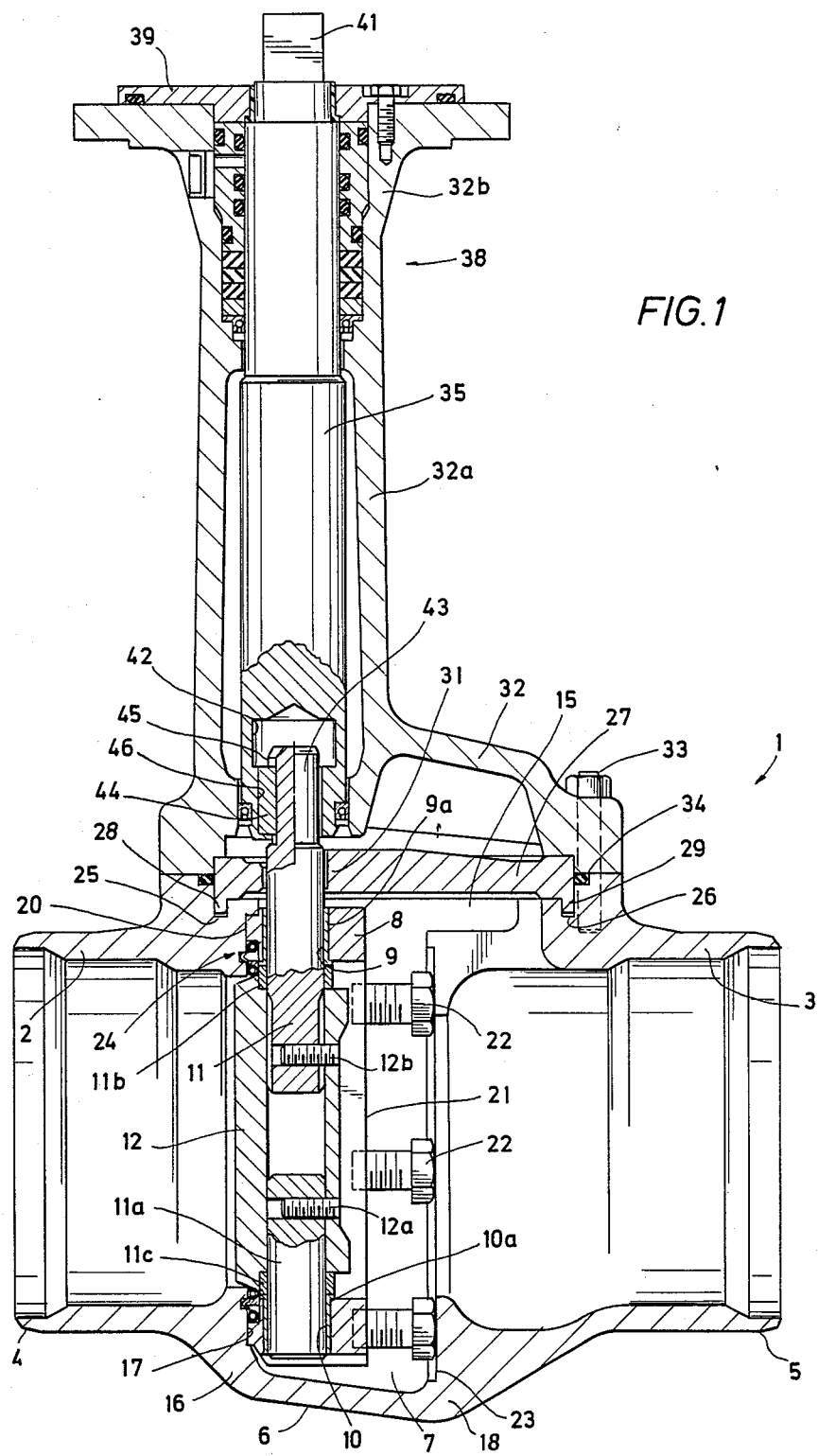
FIG. 1 is an axial section through an inspectable butterfly valve in accordance with the invention.

As shown in FIG. 1, the valve is formed of a monoblock tubular body 1 having two coaxial tubular portions 2, 3 provided, at their opposite ends, with two welding butts 4, 5 respectively and, between these two portions, a central portion 6 defining a shutoff chamber 7 intended to receive a shutoff module formed of an annular pre-body 8. The pre-body is provided with two coaxial, substantially radial boreholes 9 and 10. Within the bore holes 9 and 10 plastic tubular sleeves 9a and 10a respectively form bearings in which the shafts 11 and 11a of a butterfly 12 are trunnioned. The butterfly 12 is fastened to the shaft 11a by a threaded stud 12a. A similar threaded stud 12b secures the butterfly 12 to shaft 11. The butterfly 12 is positioned in the pre-body 8 by upper and lower tubular spacing sleeves 11b and 11c on shafts 11 and 11a. The sleeves extend between the butterfly and the pre-body and generally center the butterfly in the pre-body while the two shafts float in their bearings.

Figure 2:
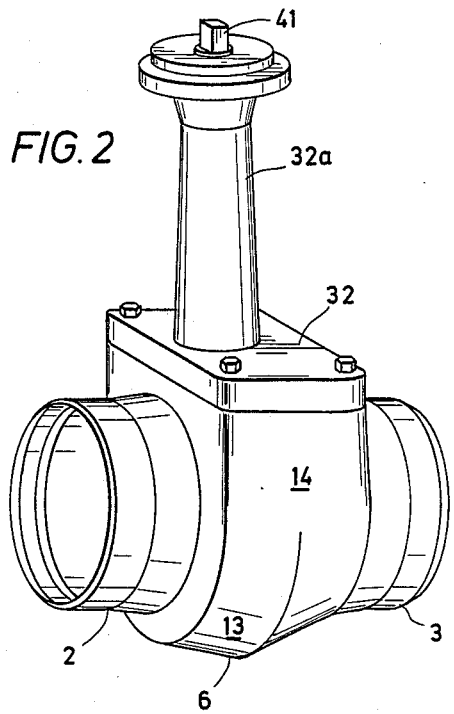
FIG. 2 is a diagrammatic view, in perspective, of the butterfly valve shown in FIG. 1.

As can be more particularly noted from FIG. 2, the central portion 6 comprises a part (in this case the lower portion) of substantially semicylindrical shape 13 of an inside diameter greater than that of the tubular portions 2, 3 and coaxial with them, said semicylindrical portion being extended, beyond its axial face, by a portion (here the upper portion) of substantially parallel piped shape 14 open practically over the entire extent of its side located opposite said axial face, said opening 15 forming an inspection trap.

The connection between the tubular portion 2 and the central portion 6 is assured by a connecting zone 16 which has a first annular inner radial face 17 surrounding the bore of said portion 2, while the connection between the tubular portion 3 and the central portion 6 is effected by a connecting zone 18.

In the example shown, the pre-body 8 has a section of rectangular shape and an outside diameter slightly less than the inside diameter of the semicylindrical portion 13 that is provided by the chamber 7.

As a result, the pre-body 8, provided with its butterfly 12 and its pivotings, can be introduced into the shutoff chamber 7 through inspection trap 15 and be positioned with its first radial flank 20 against the inner radial face 17 of the connecting zone 16.

In order to permit its attachment and clamping against the radial face 17, this pre-body 8 is provided with a series of internally threaded axial boreholes which are distributed on its radial flank 21 opposite the flank 20 and in each of which there is screwed a screw 22 the head of which, during the course of unscrewing or extending bears against a second annular inner radial face 23 in said body positioned to confront said radial face 17. If desired compressible elastic elements such as Belleville washers may be positioned between the screws 22 and the second radial face 23.

Of course, the invention is not limited to this sole manner of attachment and clamping. It would, for example, be possible to use, instead of the bolts 22, wedges or the like force-fitted between the face 23 and the pre-body 8.

A seal means indicated generally at 24 seals between the pre-body and body and between the pre-body and butterfly.

Alignment is preferably provided between the body and pre-body to obtain the desired orientation of the shaft 11. For this purpose the body is provided with grooves 25 and 26. An alignment plate 27 is provided with downturned flanges 28 and 29 which project into grooves 25 and 26 respectively. A borehole 31 through the plate receives the shaft 11. When viewed from above the plate 27 is generally rectangular and extends a short distance to either side of the shaft 11 in a plane transverse to the flowway through the valve. If desired the plate may be further narrowed by quarter-moon cutouts in opposite sides between the borehole 31 and flange 29 to provide better access to the bolts 22.

After the pre-body is positioned in the body as shown in FIG. 1 the alignment plate is passed over the free end of shaft 11 and the flanges 28 and 29 positioned in their grooves. The pre-body 8 may then be finally aligned with the borehole 31 before the bolts 22 are unscrewed to their fully extended position to firmly clamp the pre-body against the first radial face 17. Access is provided to unscrew the bolts 22 in the spaces between the body and alignment plate 27 and through the inspection trap 15. If desired the alignment plate may be removed after orienting the pre-body for final unscrewing of the bolts 22 and then repositioned for final assembly and checking of alignment of the shaft 11.

A cap 32 is secured over the chamber 7 by a plurality of bolts 33 to close the inspection trap 15. A seal 34 is provided between the cap and body.

The cap has a tubular neck 32a within which a shaft for the driving in rotation of the butterfly 12 is provides. This may be a single shaft. It is preferred that the drive shaft be in two parts. For this purpose the shaft 35 is provided in the neck 32a. It is rotatably mounted, with a seal in the head 32b of the neck 32a by means of a stuffing box indicated generally at 38 which includes bearings and seals arranged in conventional manner. The top of neck 32a is closed by a plate 39.

In order to permit its operation the shaft 35 comprises, for instance, at its one end extending from the head 32b of the neck 32a, an operating square 41 on which an operating hand wheel or actuator can be mounted.

In order to permit its coupling to the shaft of the butterfly it comprises, at its other end, a bore 42 in which there engages, with slight play, an extension 43 of the shaft 11 extending from the pre-body 8 and passing through the borehole in the plate 27. A key 44 in slots 45 and 46 in shafts 11 and 35 respectively couples the two shafts together. This loose coupling permits filtering out of parasitic forces due to misalignment or deformation in use.

It is clear that the shafts 11 and 35 could be made in one and the same piece without thereby going beyond the scope of the invention.

FIGS. 3 and 4 shown, on a larger scale, two variants of this device which employs a flexible metal double toric joint mounted in a radial annular groove 48 formed between the radial flank 20 of the pre-body 8 and the inner radial face 17 of the connecting zone 16.

For this purpose, the radial flank 20 of the pre-body 8 can comprise, as shown in FIG. 3, within a circular zone adjacent to its inner cylindrical surface, a groove 49.

In this case the double toric joint comprises:

a first toric-joint structure 51 intended to assure a static seal with the body 1 of the valve;

a second toric-joint structure 52 intended to seal with the edge 53 of the butterfly 12 so as to obtain so-called dynamic tightness with the latter;

a membrane 54 assuring continuity of the tightness between the two joint structures 51, 52, this membrane 54 having in its central region a fold 55 intended to assure radial flexibility between the two joint structures 51, 52; and a reaction ring 56 mounted clamped against the second joint structure 52 in the space between the two structures 51, 52.

In this example, the first joint structure 51 is axially compressed between the radial face 17 of the body 1 and the step 49 of the radial flank 20 of the pre-body 8. On the other hand, the second joint structure 52 can move radially in the space contained between the step 49 and the radial face 17 of the body. The latter comprises, furthermore, an axial annular groove 57 in which the fold 55 of the membrane 54 is contained.

In the embodiment shown in FIG. 4, the radial flank 20 of the pre-body 8 does not have any step and it forms with the inner face 17 an annular groove 58 of substantially rectangular section.

In this case, the first toric-joint structure 51 is radially compressed between the bottom 59 of the groove 58 and a second reaction ring 61 which extends in the free space between the first reaction ring 56 and the first joint structure 51.

In FIG. 3, a tubular spacing sleeve 11c on the shaft 11 between the pre-body 8 and the butterfly 12 positions the butterfly in proper relationship with the pre-body 8. A similar sleeve 62 is provided in the FIG. 4 illustration for the same purpose. A plastic bearing 63 receives shaft 11a.

FIG. 5 shows a reverse mounting as compared with those shown in FIGS. 3 and 4 in the sense that the double toric joint 51, 52, 54, 56, similar to that of FIG. 3, is borne by the butterfly 12 of the valve, while the sealing surface associated with this double joint consists of a cone-shaped seat 64 developed within the body 1 of the valve.

The butterfly 12 therefore comprises, at the level of its edge, an annular cavity 65 of a shape similar to that shown in FIG. 3, which contains the double joints 51, 52, 54, 56 in the manner previously indicated. The shaft is supported in bearing 66.

Of course, the invention is not limited to the seals described above. They could just as well consist of other types of joints, for instance bead joints of elastomer, plastomer or composite materials.

What is claimed is:

1. A butterfly valve of inspectable type comprising:
   a tubular body, the central portion of which defines a shutoff chamber, communicating with the outside through a lateral orifice forming an inspection trap;
   a first annular inner radial face in said tubular body;
   a second inner radial face in said body confronting said first face,
   an annular pre-body in said chamber,
   said pre-body adapted to pass through said orifice,
   said pre-body provided with two substantially radial boreholes which are diametrically opposite each other with the axis of the said boreholes passing through the said orifice;
   extensible clamping means between said pre-body and said second face axially clamping a first radial flank of said pre-body against said first radial face by exerting a force moving said radial flank toward said first radial face to removably fasten said pre-body in said body:
   a butterfly valve member;
   shaft means positioned in said boreholes and mounting said valve member for rotation;
   sealing means adapted to cooperate with one of said body and pre-body and with the said butterfly valve member to provide upstream/downstream tightness of the valve; and
   a cap adapted to be mounted on said body in such a manner as to tightly and removably close said orifice, said cap having a passage in which said shaft means is rotatably mounted.

2. The valve of claim 1 wherein said shaft means is provided by two coupled shafts one of which is mounted in the pre-body and the other is mounted in and extends through said cap; said coupling providing a slight play so as to transmit the operating torque and filer out the parasitic forces due to misalignments or deformations in operation.

3. The valve of claim 1 wherein the clamping means comprise bolts which are screwed into tapped boreholes produced on the radial flank of the pre-body opposite said first radial flank.

4. The valve of claim 2 wherein the clamping means comprise bolts which are screwed into tapped boreholes produced on the radial flank of the pre-body opposite said first radial flank.

5. The valve of claim 1 wherein said sealing means comprise a seal mounted in a radial annular groove formed between the first radial flank of the pre-body and the inner radial face of the body.

6. The valve of claim 5 wherein said seal means consists of a flexible metal double toric joint comprising:
   a first toric joint structure between the body and pre-body intended to assure static tightness with the body of the valve;
   a second toric joint structure of a diameter less than that of the first structure and intended to cooperate with the edge of the butterfly valve member so as to obtain dynamic tightness with it;
   a membrane assuring continuity of the seal between the two joint structures; and
   a mounted reaction ring clamped against the second joint structure in the space contained between the two structures.

7. A valve according to claim 6 wherein said first joint structure is axially compressed between the radial face of the body and the radial flank of the pre-body.

8. A valve according to claim 6 wherein said first joint structure is radially compressed between the bottom of the groove and a second reaction ring arranged in the space contained between said first reaction ring and said first joint structure.

9. A valve according to claim 1 wherein said orifice provides access to said clamping means.

* * * * *